(12) United States Patent
Kobayashi

(10) Patent No.: US 11,119,639 B2
(45) Date of Patent: Sep. 14, 2021

(54) NON-TRANSITORY COMPUTER-READABLE MEDIUM STORING AN EXTRA INFORMATION SUPERPOSITION PROGRAM, EXTRA INFORMATION SUPERPOSITION METHOD, AND EXTRA INFORMATION SUPERPOSITION METHOD, AND EXTRA INFORMATION SUPERPOSITION DEVICE

(71) Applicant: TRANSRECOG, CO., LTD., Tokyo (JP)

(72) Inventor: Takaaki Kobayashi, Tokyo (JP)

(73) Assignee: TRANSRECOG CO., LTD., Tokyo (JP)

( * ) Notice: Subject to any disclaimer, the term of this patent is extended or adjusted under 35 U.S.C. 154(b) by 0 days.

(21) Appl. No.: 16/868,835

(22) Filed: May 7, 2020

(65) Prior Publication Data
US 2020/0264763 A1    Aug. 20, 2020

Related U.S. Application Data

(63) Continuation of application No. PCT/JP2018/025930, filed on Jul. 9, 2018.

(30) Foreign Application Priority Data

Nov. 9, 2017 (JP) .................. 2017-216558

(51) Int. Cl.
*G06F 3/0484* (2013.01)
*G06F 3/0481* (2013.01)
*G06F 3/0485* (2013.01)

(52) U.S. Cl.
CPC ........ *G06F 3/04845* (2013.01); *G06F 3/0485* (2013.01); *G06F 3/04817* (2013.01); *G06F 3/04847* (2013.01)

(58) Field of Classification Search
CPC ............ G06F 3/04845; G06F 3/04817; G06F 3/04847; G06F 3/0485
See application file for complete search history.

(56) References Cited

U.S. PATENT DOCUMENTS

| 9,619,435 B2 * | 4/2017 | Wendt ................. G06F 3/04847 |
| 2006/0274053 A1 * | 12/2006 | Kinouchi .............. G06F 3/0485 345/173 |

(Continued)

FOREIGN PATENT DOCUMENTS

| JP | 9-160905 A | 6/1997 |
| JP | 2004-13318 A | 1/2004 |

(Continued)

OTHER PUBLICATIONS

International Search Report dated Oct. 9, 2018 from corresponding International Patent Application No. PCT/JP2018/025930, 3 pages.

(Continued)

*Primary Examiner* — Nicholas Klicos
(74) *Attorney, Agent, or Firm* — Ohlandt, Greeley, Ruggiero & Perle, L.L.P.

(57) ABSTRACT

To cause a computer configured to execute, by starting first software to implement, first display processing for displaying a first information display window to function as an extra information superposition device including a processing unit and a storage unit, wherein the processing unit configured to (i) execute second display processing for displaying a second information display window capable of receiving input of extra information to be superposed at least on a part of the first information display window, by starting second software independent from the first software to implement, and (ii) execute third display processing for displaying the extra information in the second information display window, when there is input of extra information to the second information display window made by a user.

4 Claims, 12 Drawing Sheets

(56) References Cited

U.S. PATENT DOCUMENTS

| | | | | |
|---|---|---|---|---|
| 2007/0030245 A1* | 2/2007 | Ngari | ............... | G06F 3/0481 |
| | | | | 345/156 |
| 2008/0074434 A1* | 3/2008 | Wakayama | ............ | G06T 11/40 |
| | | | | 345/530 |
| 2008/0252662 A1* | 10/2008 | Hyatt | ............... | G06F 3/0481 |
| | | | | 345/660 |
| 2013/0335349 A1* | 12/2013 | Ferren | .............. | G06K 9/3266 |
| | | | | 345/173 |
| 2014/0282224 A1* | 9/2014 | Pedley | .............. | G06F 3/0485 |
| | | | | 715/784 |
| 2015/0110347 A1* | 4/2015 | Suzuki | .............. | G06K 9/2081 |
| | | | | 382/103 |
| 2017/0160906 A1* | 6/2017 | Ju | ..................... | G06F 3/04845 |
| 2018/0352205 A1* | 12/2018 | Kotani | ............... | H04N 9/3185 |
| 2020/0104586 A1* | 4/2020 | Takahashi | ......... | G06K 9/00402 |

FOREIGN PATENT DOCUMENTS

| | | |
|---|---|---|
| JP | 2012-133493 A | 7/2012 |
| JP | 2015-210578 A | 11/2015 |

OTHER PUBLICATIONS

Written Opinion dated Oct. 9, 2018 from corresponding International Patent Application No. PCT/JP2018/025930, 4 pages.

\* cited by examiner

NON-TRANSITORY COMPUTER-READABLE MEDIUM STORING AN EXTRA INFORMATION SUPERPOSITION PROGRAM, EXTRA INFORMATION SUPERPOSITION METHOD, AND EXTRA INFORMATION SUPERPOSITION METHOD, AND EXTRA INFORMATION SUPERPOSITION DEVICE

BACKGROUND OF THE DISCLOSURE

1. Field of the Disclosure

The present invention relates to non-transitory computer-readable medium storing an extra information superposition program used in electronic computers, extra information superposition method, and to an extra information superposition device that uses the non-transitory computer-readable medium storing the extra information superposition program and the extra information superposition method.

2. Description of the Related Art

In lectures at universities or at meetings in companies nowadays, electronic data such as PDF is distributed for references in many cases instead of paper materials. Those who are taking part in lectures or meetings have the distributed electronic data displayed on their terminals such as notebook PCs or tablet PCs. Meanwhile, there may be security and editing restrictions set on the electronic data, so that it may not be possible to directly write memos thereon. Further, even in a case of data with no security and editing restrictions set thereon, there may be such circumstances that memos cannot be directly written thereon for distributing the data to others later or that it is not desired to directly write memos thereon.

Under such circumstances, those who are taking part in the lectures and meetings open another application software on the PC to write memos thereon or write memos on a paper notebook. However, it is difficult to discriminate which part of the electronic data the memos are associated with because the electronic data and the memos are not managed in a unified manner, so that it is necessary to manage the electronic data and the memos in an associated manner.

There are various problems other than those described above. For example, it is desired to capture an image of a demonstration written on a whiteboard by a lecturer while listening to the lecture by a smartphone or a PC or acquire an image of a notice posted on a bulletin board by a smartphone or a PC and write a memo on the image. However, it is also desired to save the original image as it is and to save the added memo as a memo separately from the image.

Further, if a superior inputs indicated matters to electronic data created by a subordinate at the time of refereeing the electronic data, it becomes difficult to read out description written in the original electronic data. While it is considered to use an additional function such as a text box in order to prevent the description of the original electronic data from becoming difficult to read out, it takes time and effort to do such work. Further, it is also considered to print the electronic data once, write indicated matters thereon by hand, and return it to the subordinate. However, repetition of such work results in having mixture of a plurality of paper documents and electronic data corresponding to the paper documents, so that it takes time and effort to do version management.

Further, recently, there may be a case where a superior and subordinates are at distant places working remotely in accordance with the workstyle reform. In such a case, it is necessary to mail or scan and transmit paper documents for exchanging the paper documents. Therefore, it takes more effort and time, which results in time loss.

Further, when checking a plaintext file such as a log or a source code, electronic data is pasted once on software capable of displaying the electronic data and surrounded by a red frame or another application software is opened to write a memo, for example, to prevent the log or the source code itself from being rewritten. However, the program of the software is not constructed for checking the plaintext file. Therefore, it is not suited for displaying the plaintext file and, in addition, editing thereof takes time and effort.

PRIOR ART DOCUMENT

Patent Document

Patent Document 1: Japanese Patent Laid-Open No. 2015-210578

SUMMARY OF THE DISCLOSURE

Problems to be Solved by the Invention

As described above, when inputting memos or the like to distributed electronic data, it is necessary to associate the electronic data with the memos and to do work such as version management by each input.

An object of the present invention is to provide an extra information superposition program, an extra information superposition method, and an extra information superposition device capable of making it easy to do work such as data management and association required when inputting memos and the like to electronic data.

Means for Solving the Problems

In order to achieve the above object, aspects of the present invention are directed to non-transitory computer-readable medium storing an extra information superposition program, an extra information superposition method, and an extra information superposition device causing a computer configured to execute, by starting first software to implement, first display processing for displaying a first information display window capable of displaying a file including at least one of letters, symbols, figures, or images to function as an extra information superposition device including a processing unit and a storage unit, the medium comprising: wherein the processing unit configured to (i) execute second display processing for displaying a second information display window capable of receiving input of extra information that is at least one of the letters, the symbols, the figures, or the images to be superposed at least on a part of the first information display window, by starting second software independent from the first software to implement, and (ii) execute third display processing for displaying the extra information in the second information display window, when there is input of the extra information to the second information display window made by a user; and wherein the storage unit configured to store the file displayed in the first information display window, the extra information input to the second information display window, and positional coordinates of the extra information in the second information display window in an associated manner, when there is the input of the extra information to the second information display window made by the user.

With the above-described configuration, non-transitory computer-readable medium storing the extra information superposition program, the extra information superposition method, and the extra information superposition device according to the aspects include displaying the second information display window capable of receiving input of extra information that is at least one of the letters, the symbols, the figures, or the images to be superposed at least on a part of the first information display window. Thereby, the non-transitory computer-readable medium storing the extra information superposition program, the extra information superposition method, and the extra information superposition device according to the aspects can superpose and display the extra information input to the second information display window on the target file of the first information display window without directly editing the target file displayed in the first information display window. Further, the non-transitory computer-readable medium storing the extra information superposition program, the extra information superposition method, and the extra information superposition device according to the aspects include associating the target file with the second information display window to be superposed on the target file. That is, the non-transitory computer-readable medium storing the extra information superposition program, the extra information superposition method, and the extra information superposition device according to the aspects can save the time and effort that may be required for associating and managing the target file and the second information display window to be superposed on the target file.

Advantageous Effects of the Invention

According to the present invention, the non-transitory computer-readable medium storing the extra information superposition program, the extra information superposition method, and the extra information superposition device can make it easy to do work such as data management and association required when inputting memos and the like to electronic data.

DESCRIPTION OF THE DISCLOSURE

Hereinafter, a document management system including an electronic computer (extra information superposition device) using non-transitory computer-readable medium storing an extra information superposition program and an extra information superposition method according to an embodiment of the present invention will be described by referring to the accompanying drawings. Note that the embodiment is not limited to the contents described hereinafter but various changes are possible without departing from the scope of the gist thereof. Further, all the drawings used for describing the embodiment schematically illustrate the structural components that may be partially emphasized, enlarged, reduced, or omitted, for example, to implement better understanding, so that the scales, shapes, and the like of the structural components may not accurately reflect the actual ones.

Figure 1:
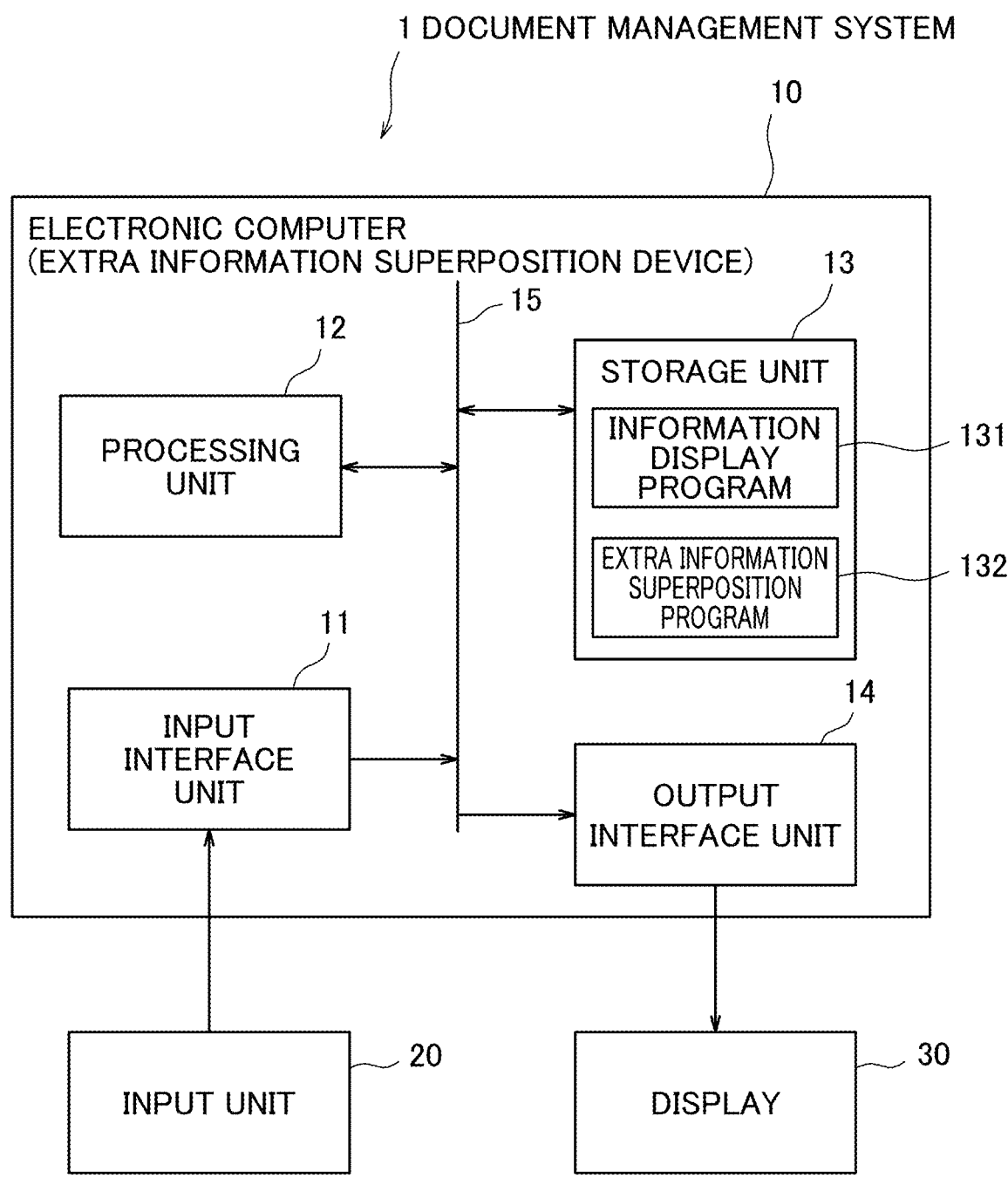
FIG. 1 is a block diagram showing a document management system including an electronic computer that implements an extra information superposition function according to an embodiment.

FIG. 1 is a block diagram showing a document management system 1 including an electronic computer 10 that implements an extra information superposition function according to the embodiment. The document management system 1 shown in FIG. 1 has a configuration for displaying a first information display window that is capable of displaying a file including at least one of letters, symbols, figures, or images by starting prescribed application software (first software), for example. Further, the document management system 1 has a configuration for superposing and displaying a second information display window to which extra information that is at least one of letters, symbols, figures, or images can be input, at least on a part of the first information display window by starting information superposition software (second software) that is independent from the first software.

Note here that the first software according to the embodiment includes application software such as document editing/displaying software using multi-purpose office document file formats such as Office suite, a text editor, a Web browser, and PDF, image editing software for editing images, and an image viewer for displaying images. Note that the Office suite includes application software such as a word processor, a spreadsheet, a presentation, a mail user agent, a Personal Information Manager (PIM), Desktop Publishing (DTP), and a database.

The document management system 1 shown in FIG. 1 includes the electronic computer (extra information superposition device) 10, an input unit 20, and a display 30. The electronic computer 10 is mutually connected to the input unit 20 and the display 30.

The electronic computer 10 exchanges data with connected apparatuses and executes calculation processing related to each software. As shown in FIG. 1, the electronic computer 10 includes an input interface unit 11, a processing unit 12, a storage unit 13, and an output interface unit 14, for example. The input interface unit 11, the processing unit 12, the storage unit 13, and the output interface unit 14 are mutually connected via a bus 15 provided internally.

The input interface unit 11 converts an input operation of the user input via the input unit 20 into an electric signal and outputs the electric signal to the processing unit 12. For example, the input interface unit 11 according to the embodiment receives input of extra information to the second information display window made by the user, and converts the input extra information into an electric signal to output the electric signal to the processing unit 12. Note here that the input unit 20 according to the embodiment is at least one of a mouse, a keyboard, a track ball, switch buttons, a touch pad with which input operations are performed by touching an operation screen, a stylus pen for inputting handwriting, and a touch panel display in which a display screen and a touch pad are integrated.

The processing unit 12 includes a prescribed processor such as a CPU (Central Processing Unit) and an MPU (Micro Processing Unit) as a hardware resource. The processor of the processing unit 12 reads an information display program 131 stored in the storage unit 13. The information display program 131 corresponds to first software. The processor of the processing unit 12 executes first display processing for displaying a first information display window that is capable of displaying a file including at least one of letters, symbols, figures, or images by starting the first software through executing the read information display program 131.

Further, the processor of the processing unit 12 reads an extra information superposition program 132 stored in the storage unit 13. The extra information superposition program 132 corresponds to second software. The processor of the processing unit 12 starts second software that is independent from the first software through executing the read extra information superposition program 132 to execute second display processing for superposing and displaying a second information display window to which extra information that is at least one of letters, symbols, figures, or images can be input, at least on a part of the first information display window. Further, when there is the input of the extra information to the second information display window made by the user, the processor of the processing unit 12 executes third display processing for displaying the extra information in the second information display window.

The storage unit 13 includes a ROM (Read Only Memory), a RAM (Random Access Memory), and an HDD (Hard Disk Drive) as well as an SSD (Solid State Drive) capable of storing data. The storage unit 13 stores the information display program 131 and the extra information superposition program 132, for example. Further, when there is the input of the extra information to the second information display window made by the user, the storage unit 13 stores the file displayed in the first information display window, the extra information input to the second information display window, and positional coordinates of the extra information in the second information display window in an associated manner. Further, the storage unit 13 stores a correction file used in the initial setting to be described later. Note here that the correction file is prepared for each of the first software. Further, the correction file has a format that can be displayed in the first information display window, and includes a plurality of figures. The storage unit 13 may also utilize optical discs such as a magneto-optical disc, a CD (Compact Disc), and a DVD (Digital Versatile Disc) other than a magnetic disk such as an HDD. Further, a storage area of the storage unit 13 may be inside the electronic computer 10 or may be in an external storage device connected via a network.

The output interface unit 14 converts data output from the processing unit 12 into a control signal of the display 30 and outputs the control signal to the display 30. For example, the output interface unit 14 according to the embodiment outputs the first information display window and the second information display window output from the processing unit 12 to the display 30. Note here that the output interface unit 14 according to the embodiment may be connected to an external output apparatus such as a printer.

The display 30 displays various types of data according to control by the processing unit 12. For example, the display 30 displays the first information display window and the second information display window output from the processing unit 12. The display 30 includes a display interface circuit and a display apparatus. The display interface circuit converts data showing a display target into a video signal. The display signal is supplied to the display apparatus. The display apparatus displays the video signal showing the display target. As examples of the display apparatus, a CRT display (Cathode Ray Tube Display), a liquid crystal display (LCD), an organic electro luminescence display (OELD), a plasma display, or any other displays known in the art may be utilized as appropriate.

Now, each processing executed in the document management system 1 according to the embodiment will be described by referring to FIG. 2 to FIG. 13.

(Initial Setting)

Figure 2A:
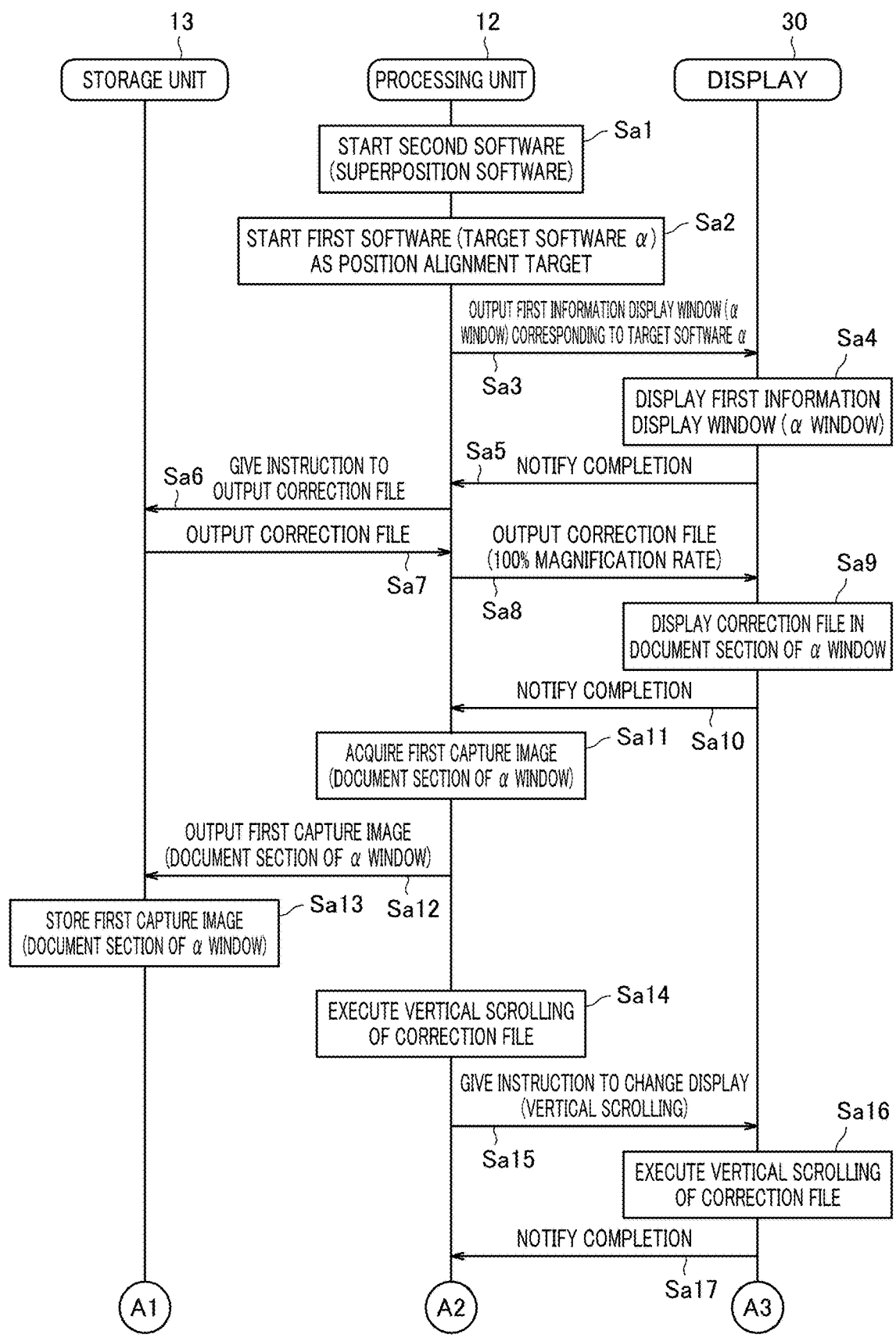
FIG. 2A is a sequence chart showing an example of position alignment between a first information display window and a second information display window in the document management system according to the embodiment.
Figure 2B:
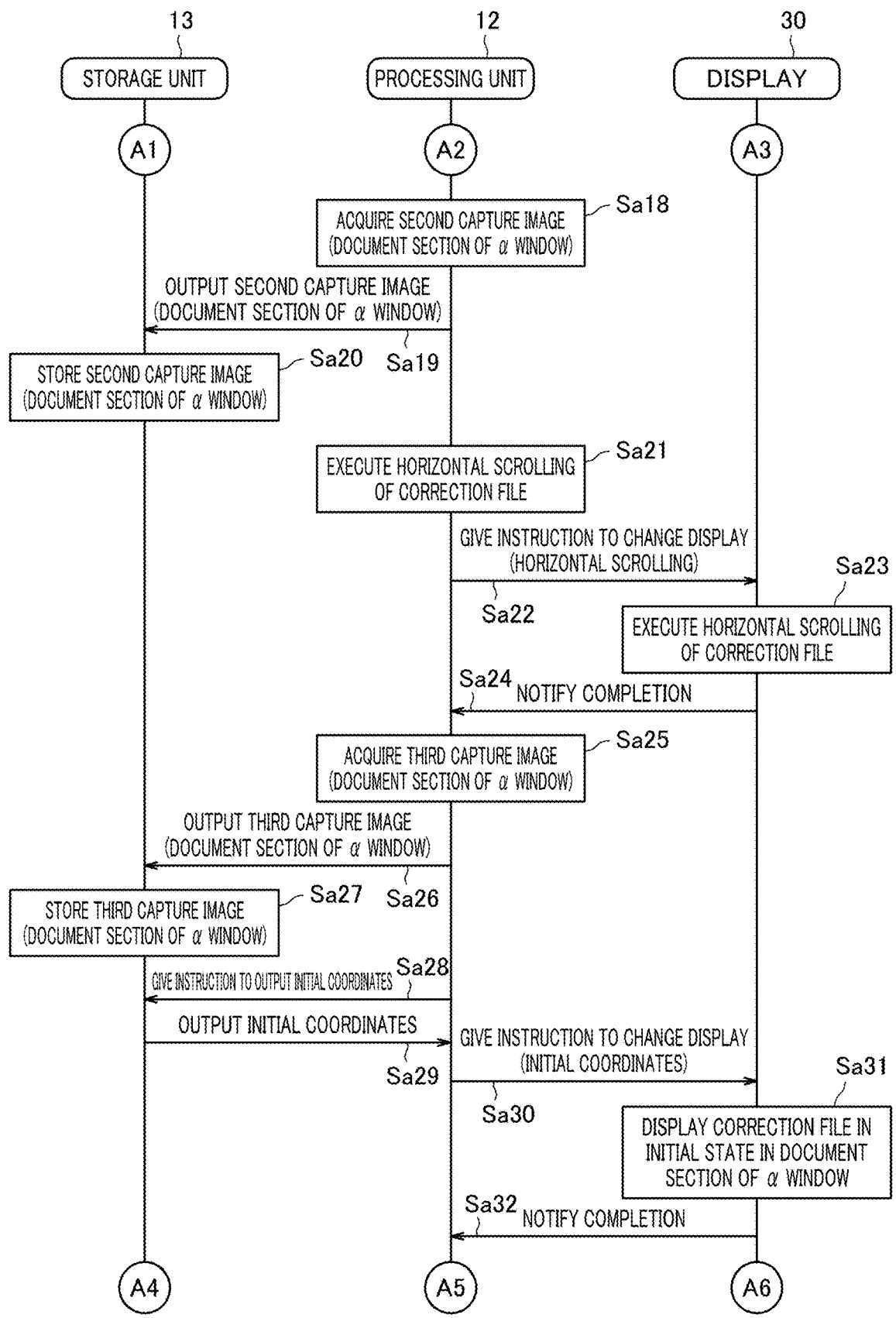
FIG. 2B is a sequence chart showing an example of position alignment between the first information display window and the second information display window in the document management system according to the embodiment.
Figure 2C:
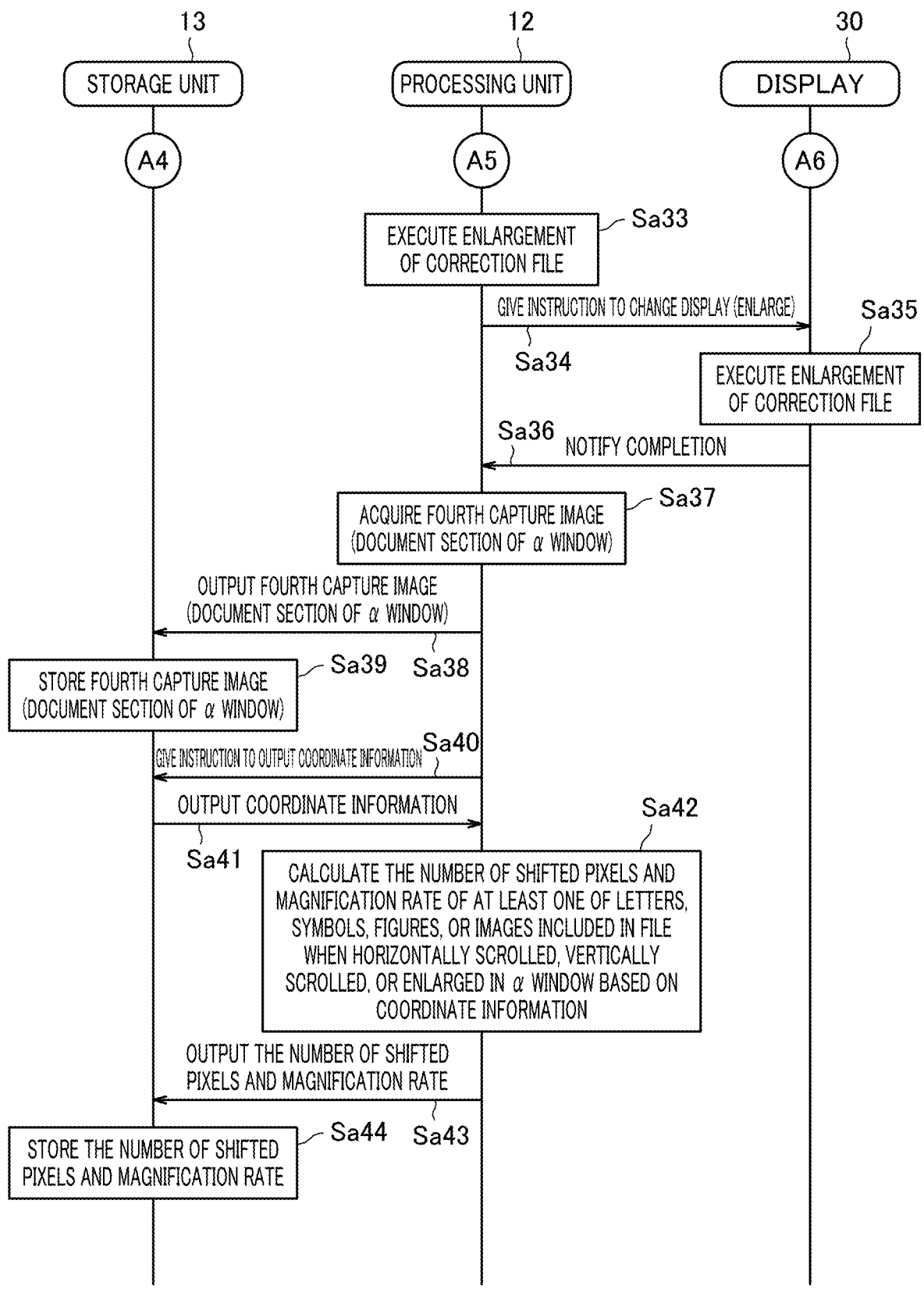
FIG. 2C is a sequence chart showing an example of position alignment between the first information display window and the second information display window in the document management system according to the embodiment.

First, the initial setting of the document management system 1 according to the embodiment will be described by referring to FIG. 2 to FIG. 7. Note here that the initial setting in the embodiment is to execute position alignment between the first information display window and the second information display window, for example. FIG. 2A to FIG. 2C are sequence charts showing an example of position alignment between the first information display window and the second information display window in the document management system 1 according to the embodiment.

As shown in FIG. 2A, in step Sa1, the processing unit 12 starts the second software. For example, the processing unit 12 reads the extra information superposition program 132 corresponding to the second software from the storage unit 13 by taking start of the OS or a startup operation by the user as a trigger. Further, the processing unit 12 executes the extra information superposition program 132 read from the storage unit 13. Thereby, the processing unit 12 starts the second software. Hereinafter, the second software is expressed as superposition software in the embodiment for the sake of explanation.

In step Sa2, the processing unit 12 starts the first software that is the position alignment target of the superposition software. In step Sa3, the processing unit 12 outputs the first information display window corresponding to the first software as the position alignment target of the superposition software to the display 30. In step Sa4, the display 30 displays the first information display window corresponding to the first software output from the processing unit 12. In step Sa5, the display 30 notifies the processing unit 12 that the first information display window corresponding to the first software is displayed.

Figure 3:
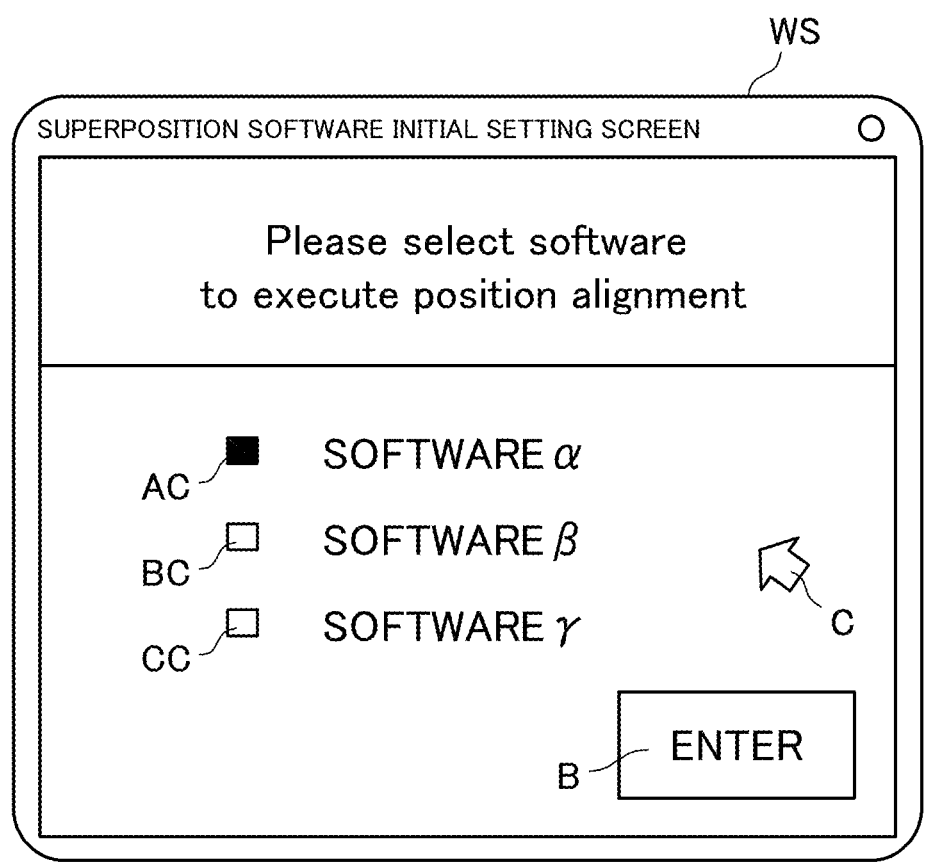
FIG. 3 is a diagram showing an initial setting screen corresponding to superposition software displayed on a display.

FIG. 3 is a diagram showing an initial setting screen WS corresponding to the superposition software displayed on the display 30. For example, the processing unit 12 displays the initial setting screen WS shown in FIG. 3 on the display 30. Among any kinds of first software written on the initial setting screen WS shown in FIG. 3, the first software to be the position alignment target of the superposition software is selected by a cursor C. For example, as shown in FIG. 3, a checkbox AC corresponding to software α displayed on the initial setting screen WS is clicked via the cursor C and an enter button B is clicked further.

The processing unit 12 reads the information display program 131 corresponding to the selected first software from the storage unit 13 by taking selection of the first software that is the position alignment target as a trigger. Further, the processing unit 12 executes the information display program 131 read from the storage unit 13. Thereby, the processing unit 12 starts the first software as the position alignment target of the superposition software. For example, the processing unit 12 starts the software α selected on the initial setting screen WS. At this time, the processing unit 12 displays, at least on a part of the display 30, the first information display window capable of displaying a file that corresponds to the selected software α and includes at least one of letters, symbols, figures, or images (first display processing). Hereinafter, the selected software α is expressed as target software α in the embodiment for the sake of explanation. Further, the first information display window corresponding to the target software α is expressed as an α window.

In step Sa6, the processing unit 12 gives an instruction to the storage unit 13 to output a correction file that corresponds to the target software α. In step Sa1, upon receiving the instruction from the processing unit 12 for outputting the correction file that corresponds to the target software α, the storage unit 13 outputs the correction file corresponding to the target software α to the processing unit 12. In step Sa8, the processing unit 12 outputs the correction file output from the storage unit 13 to the display 30. In step Sa9, the display 30 displays the correction file output from the processing unit 12 in the α window. Specifically, the display 30 displays the correction file in a document section of the α window with a magnification rate of 100% of the target software α. In step Sa10, the display 30 notifies the processing unit 12 that the correction file is displayed in the α window (notification of completion).

Figure 4:
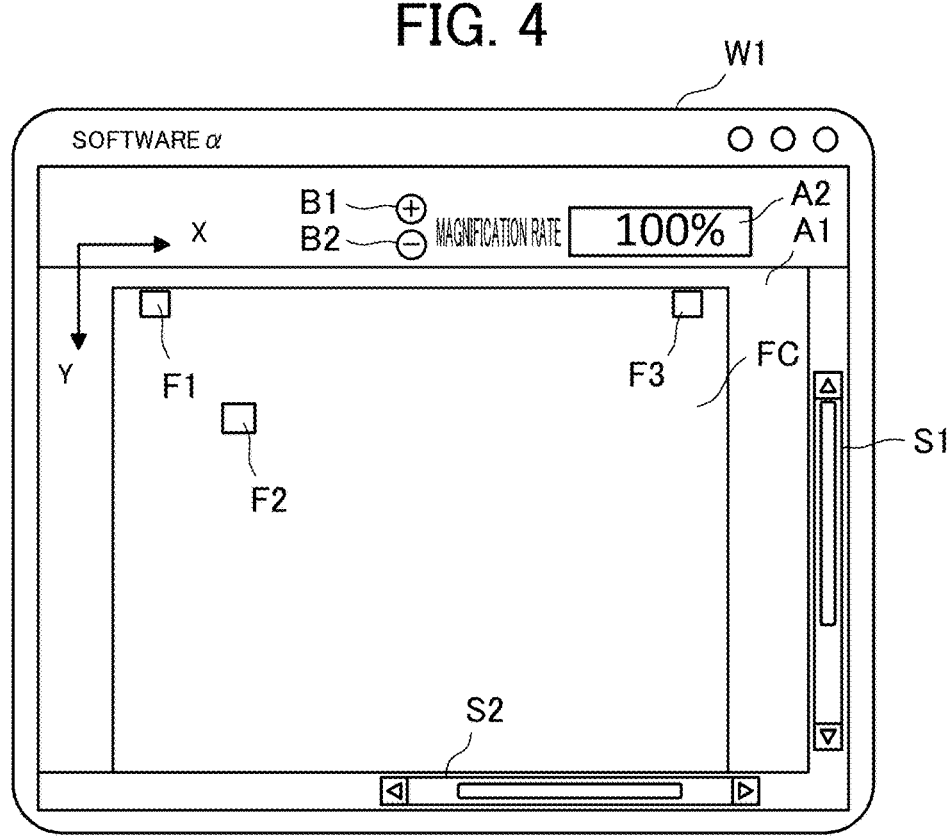
FIG. 4 is a diagram showing a correction file displayed on the first information display window of the display.

FIG. 4 is a diagram showing a correction file FC displayed in the α window W1 of the display 30. In the α window W1 shown in FIG. 4, provided are a document section A1 for displaying the file, sliders S1, S2, a magnification rate display section A2 that displays the magnification rate of the file, a zoom-in button B1 corresponding to enlargement of the file, and a zoom-out button B2 corresponding to reduction of the file, for example. The slider S1 corresponds to scrolling in the vertical direction (Y-axis direction), and the slider S2 corresponds to scrolling in the horizontal direction (X-axis direction).

As shown in FIG. 4, the display 30 displays the correction file FC output from the processing unit 12 in the document section A1 of the α window W1. At this time, the display 30 displays the correction file FC with a magnification rate of 100% of the target software α. Note here that a plurality of figures F1, F2, and F3 are included in the correction file FC. The figure F1 is disposed closer to the left end of the correction file. The figure F2 is disposed closer to the right end of the correction file. The figure F3 is disposed closer to the center of the correction file. Each of the plurality of figures F1, F2, and F3 has coordinate information (a coordinate in the X-axis direction and a coordinate in the Y-axis direction in the embodiment) in the α window W1.

In step Sa11, the processing unit 12 acquires a screen capture image (first capture image) in a display area including the correction file FC displayed in the document section A1 of the α window W1 (state of FIG. 4) by taking reception of the notification of completion from the display 30 as a trigger. In step Sa12, the processing unit 12 outputs the acquired first capture image to the storage unit 13 along with the coordinate information of the plurality of figures F1, F2, and F3 in the correction file FC included in the acquired first capture image. In step Sa13, the storage unit 13 stores the first capture image and the coordinate information of the plurality of figures F1, F2, and F3 output from the processing unit 12. Note here that the coordinates of the plurality of figures F1, F2, and F3 corresponding to the first capture image are defined as each of initial coordinates of the plurality of figures F1, F2, and F3 in the α window W1 of the correction file FC.

In step Sa14, the processing unit 12 executes vertical scrolling of the correction file. In step Sa15, the processing unit 12 outputs a display change instruction to the display 30 for vertically scrolling and displaying the correction file. In step Sa16, the display 30 vertically scrolls and displays the correction file according to the display change instruction from the processing unit 12. In step Sa17, the display 30 notifies the processing unit 12 that the correction file is vertically scrolled and displayed (notification of completion).

Figure 5:
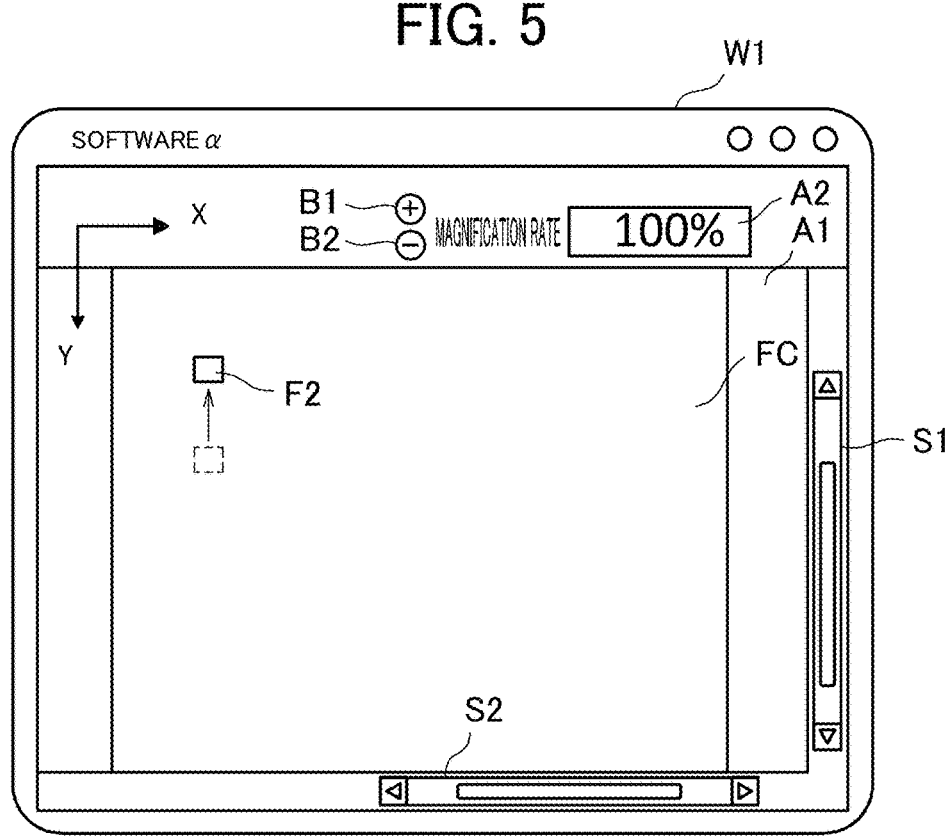
FIG. 5 is a diagram showing the correction file displayed on the first information display window of the display when vertically scrolled.

FIG. 5 is a diagram showing the correction file FC displayed in the α window W1 of the display 30 when vertical scrolling is executed. As shown in FIG. 5, the display 30 displays the correction file FC output from the processing unit 12 scrolled in the vertical direction. For example, displayed on the display 30 is the correction file FC scrolled in the vertical direction for a click on the slider S1. Note that in the embodiment, a click on the slider S1 is defined as one scrolling in the vertical direction. Note here that the plurality of figures F1, F2, and F3 included in the correction file FC are scrolled in the vertical direction, so that there are changes in the display positions thereof in the α window W1. For example, the plurality of figures F1 and F3 disappear from the document section A1, and the figure F2 is shifted toward the Y-axis direction.

After completing step Sa17, the procedure is shifted to step Sa18 shown in FIG. 2B.

As shown in FIG. 2B, in step Sa18, the processing unit 12 acquires a screen capture image (second capture image) in a display area including the correction file FC displayed in the document section A1 of the α window W1 (state of FIG. 5 where the figures F1 and F3 have disappeared) by taking reception of the notification of completion from the display 30 as a trigger. In step Sa19, the processing unit 12 outputs the acquired second capture image to the storage unit 13. Further, the processing unit 12 outputs the coordinate information of the figure F2 displayed in the α window W1 to the storage unit 13 along with the second capture image. In step Sa20, the storage unit 13 stores the second capture image and the coordinate information of the figure F2 displayed in the α window W1 output from the processing unit 12. Note here that the coordinates of the figure F2 corresponding to the second capture image are defined as the coordinates of the figure F2 in the α window W1 of the correction file FC when vertical scrolling is executed.

In step Sa21, the processing unit 12 executes horizontal scrolling of the correction file. In step Sa22, the processing unit 12 outputs a display change instruction to the display 30 for horizontally scrolling and displaying the correction file. In step Sa23, the display 30 horizontally scrolls and displays the correction file according to the display change instruction from the processing unit 12. In step Sa24, the display 30 notifies the processing unit 12 that the correction file is horizontally scrolled and displayed (notification of completion).

Figure 6:
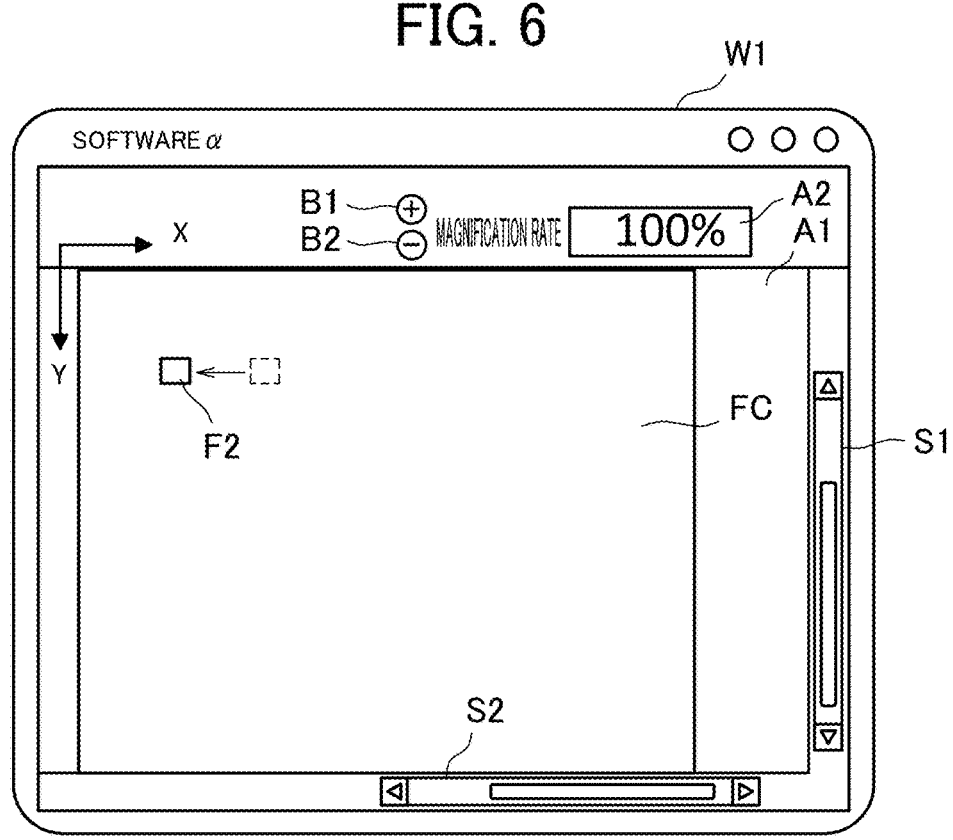
FIG. 6 is a diagram showing the correction file displayed on the first information display window of the display when horizontally scrolled.

FIG. 6 is a diagram showing the correction file FC displayed in the α window W1 of the display 30 when horizontal scrolling is executed. As shown in FIG. 6, the display 30 displays the correction file FC (state in FIG. 5) output from the processing unit 12 scrolled in the horizontal direction. For example, displayed on the display 30 is the correction file FC scrolled in the horizontal direction for a click on the slider S2. Note that in the embodiment, a click on the slider S2 is defined as one scrolling in the horizontal direction. Note here that the plurality of figures F1, F2, and F3 included in the correction file FC are scrolled in the horizontal direction, so that there are changes in the display positions thereof in the α window W1. For example, the figure F2 is shifted toward the X-axis direction.

In step Sa25, the processing unit 12 acquires a screen capture image (third capture image) in a display area including the correction file FC displayed in the document section A1 of the α window W1 (state of FIG. 6 where the figures F1 and F3 have disappeared) by taking reception of the notification of completion from the display 30 as a trigger. In step Sa26, the processing unit 12 outputs the acquired third capture image to the storage unit 13. Further, the processing unit 12 outputs the coordinate information of the figure F2 displayed in the α window W1 to the storage unit 13 along with the third capture image. In step Sa27, the storage unit 13 stores the third capture image and the coordinate information of the figure F2 output from the processing unit 12. Note here that the coordinates of the figure F2 corresponding to the third capture image are defined as the coordinates of the figure F2 in the α window W1 of the correction file FC when horizontal scrolling is executed.

Then, the processing unit 12 returns the display of the correction file to the initial state. Specifically, in step Sa28, the processing unit 12 gives an instruction to the storage unit 13 to output each of the initial coordinates of the plurality of figures F1, F2, and F3 in the α window W1 of the correction file. In step Sa29, upon receiving the instruction for outputting the initial coordinates from the processing unit 12, the storage unit 13 outputs the initial coordinates to the processing unit 12. In step Sa30, the processing unit 12 outputs a display change instruction to the display 30 for returning the display of the correction file to the initial state based on each of the initial coordinates of the plurality of figures F1, F2, and F3 output from the storage unit 13. In step Sa31, the display 30 displays the correction file such that each of the plurality of figures F1, F2, and F3 included in the correction file is positioned at the initial coordinates according to the display change instruction from the processing unit 12. In step Sa32, the display 30 notifies the processing unit 12 that the correction file is displayed such that each of the plurality of figures F1, F2, and F3 included in the correction file is positioned at the initial coordinates (notification of completion).

After completing step Sa32, the procedure is shifted to step Sa33 shown in FIG. 2C.

As shown in FIG. 2C, in step Sa33, the processing unit 12 enlarges and displays the correction file by taking reception of the notification of completion from the display 30 as a trigger. In step Sa34, the processing unit 12 outputs a display change instruction to the display 30 for enlarging and displaying the correction file. In step Sa35, the display 30 enlarges and displays the correction file according to the display change instruction from the processing unit 12. In step Sa36, the display 30 notifies the processing unit 12 that the correction file is enlarged and displayed (notification of completion).

Figure 7:
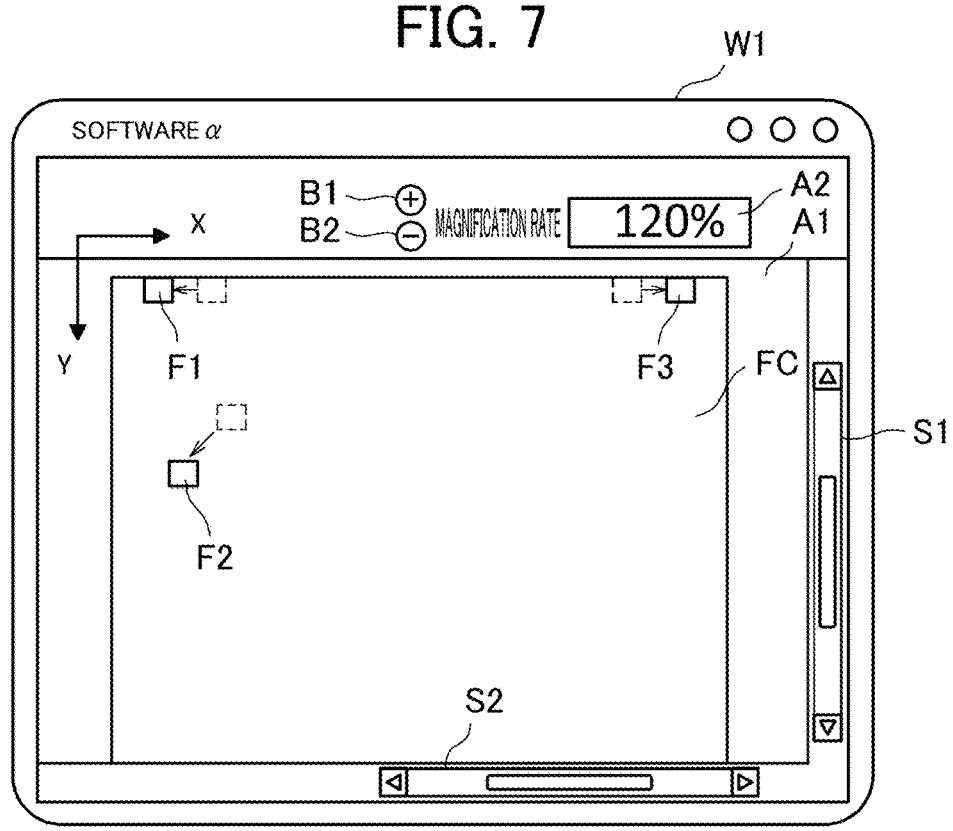
FIG. 7 is a diagram showing the correction file displayed on the first information display window of the display when enlarge-displayed.

FIG. 7 is a diagram showing the correction file FC displayed in the α window W1 of the display 30 when enlarge-displayed. As shown in FIG. 7, the display 30 enlarge-displays the correction file FC output from the processing unit 12. For example, displayed on the display 30 is the correction file FC that is enlarged for a click on the zoom-in button B1. Note that in the embodiment, the magnification rate when the zoom-in button B1 is clicked once is defined as the magnification rate of one scrolling. Note here that in the embodiment, the correction file FC is enlarged and displayed by taking the midpoint of a straight line connecting the figure F1 and the figure F3 as the center of enlargement operations. Note here that the plurality of figures F1, F2, and F3 included in the correction file FC are scrolled in the vertical direction or the horizontal direction, so that the display positions thereof in the α window W1 are changed. For example, the plurality of figures F1 and F3 are shifted in the X-axis direction, and the figure F2 is shifted in the Y-axis direction. Further, display of the magnification rate in the magnification rate display section A2 is changed from 100% to 120%.

In step Sa37, the processing unit 12 acquires a screen capture image (fourth capture image) in a display area including the correction file FC (state of FIG. 7) displayed in the document section A1 of the α window W1 by taking reception of the notification of completion from the display 30 as a trigger. In step Sa38, the processing unit 12 outputs the acquired fourth capture image to the storage unit 13. Further, the processing unit 12 outputs each of the coordinate information of the plurality of figures F1, F2, and F3 displayed in the α window W1 to the storage unit 13 along with the fourth capture image. In step Sa39, the storage unit 13 stores the fourth capture image and each of the coordinate information of the plurality of figures F1, F2, and F3 output from the processing unit 12. Note here that the coordinates of the plurality of figures F1, F2, and F3 corresponding to the fourth capture image are defined as each of the coordinates of the plurality of figures F1, F2, and F3 in the α window of the correction file FC when enlarge-displayed.

Now, Table 1 shows each of the initial coordinates of the plurality of figures F1, F2, and F3 in the α window W1 of the correction file FC, each of the coordinates of the plurality of figures F1, F2, and F3 in the α window of the correction file when vertical scrolling is executed, each of the coordinates of the plurality of figures F1, F2, and F3 in the α window W1 of the correction file FC when horizontal scrolling is executed, and each of the coordinates of the plurality of figures F1, F2, and F3 in the α window W1 of the correction file FC when enlarge-displayed, which are stored in the storage unit 13.

TABLE 1

| Types of capture image | Coordinates (FIG. 1) | Coordinates (FIG. 2) | Coordinates (FIG. 3) |
|---|---|---|---|
| Initial position | (50, 0) | (100, 100) | (400, 0) |
| Vertically scrolled | — | (100, 80) | — |
| Horizontally scrolled | — | (80, 80) | — |
| Enlarged | (20, 0) | (50, 150) | (430, 0) |

In step Sa40, the processing unit 12 gives an instruction to the storage unit 13 to output each of coordinate information shown in Table 1. In step Sa41, upon receiving the instruction from the processing unit 12 for outputting the coordinate information, the storage unit 13 outputs the coordinate information to the processing unit 12. In step Sa42, the processing unit 12 calculates the number of shifted pixels and the magnification rate of at least one of letters, symbols, figures, or images included in the file when horizontally scrolled, vertically scrolled, or enlarged in the α window W1 based on each of the coordinate information output from the storage unit 13 and shown in Table 1 (linkage information calculation processing).

First, when vertical scrolling is executed, the coordinates of the figure F2 are changed from (100, 100) to (100, 80). That is, the figure F2 is shifted by 20 pixels in the Y-axis direction per scroll. In other words, the number of shifted pixels per scroll in the vertical direction is "20".

Then, when horizontal scrolling is executed, the coordinates of the figure F2 are changed from (100, 80) to (80, 80). That is, the figure F2 is shifted by 20 pixels in the X-axis direction per scroll. In other words, the number of shifted pixels per scroll in the horizontal direction is "20".

Then, in a case of enlarge-display, the coordinates of the figure F1 are changed from (50, 0) to (20, 0). Further, the coordinates of the figure F3 are changed from (400, 0) to (430, 0). From such coordinate information, the magnification rate is calculated as (430−20)/(400−50)= 1.171428571.17143. That is, the magnification rate per scroll is 1.17143. Note here that Table 2 shows the number of shifted pixels per scroll in the vertical direction in the α window, the number of shifted pixels per scroll in the horizontal direction, and the magnification rate per scroll, which are stored in the storage unit 13.

TABLE 2

| Target software | The number of shifted pixels per scroll (vertical scroll) | The number of shifted pixels per scroll (horizontal scroll) | Magnification rate per scroll |
|---|---|---|---|
| Software α | 20 | 20 | 1.17143 |

In step Sa43, the processing unit 12 outputs the calculated number of shifted pixels and magnification rate to the storage unit 13. In step Sa44, the storage unit 13 stores the number of shifted pixels and the magnification rate output from the processing unit 12. Thereby, the initial setting of the document management system 1 is completed. The document management system 1 according to the embodiment can horizontally scroll, vertically scroll, or enlarge the extra information input to the second information display window according to the number of sifted pixels per scroll in the vertical direction, the number of sifted pixels per scroll in the horizontal direction, and the magnification rate per scroll shown in Table 2 (fourth display processing). In other words, the document management system 1 can horizontally scroll, vertically scroll, or enlarge the extra information input to the second information display window according to the number of sifted pixels and the magnification rate same as the number of shifted pixels and the magnification rate of the first information display window.

(Actual Operation)

Now, each processing executed when actually operating the document management system 1 according to the embodiment will be described by referring to FIG. 8 to FIG. 13.

(Generate Superposition Window to be Superposed on Target File Displayed on First Information Display Window)

Figure 8:
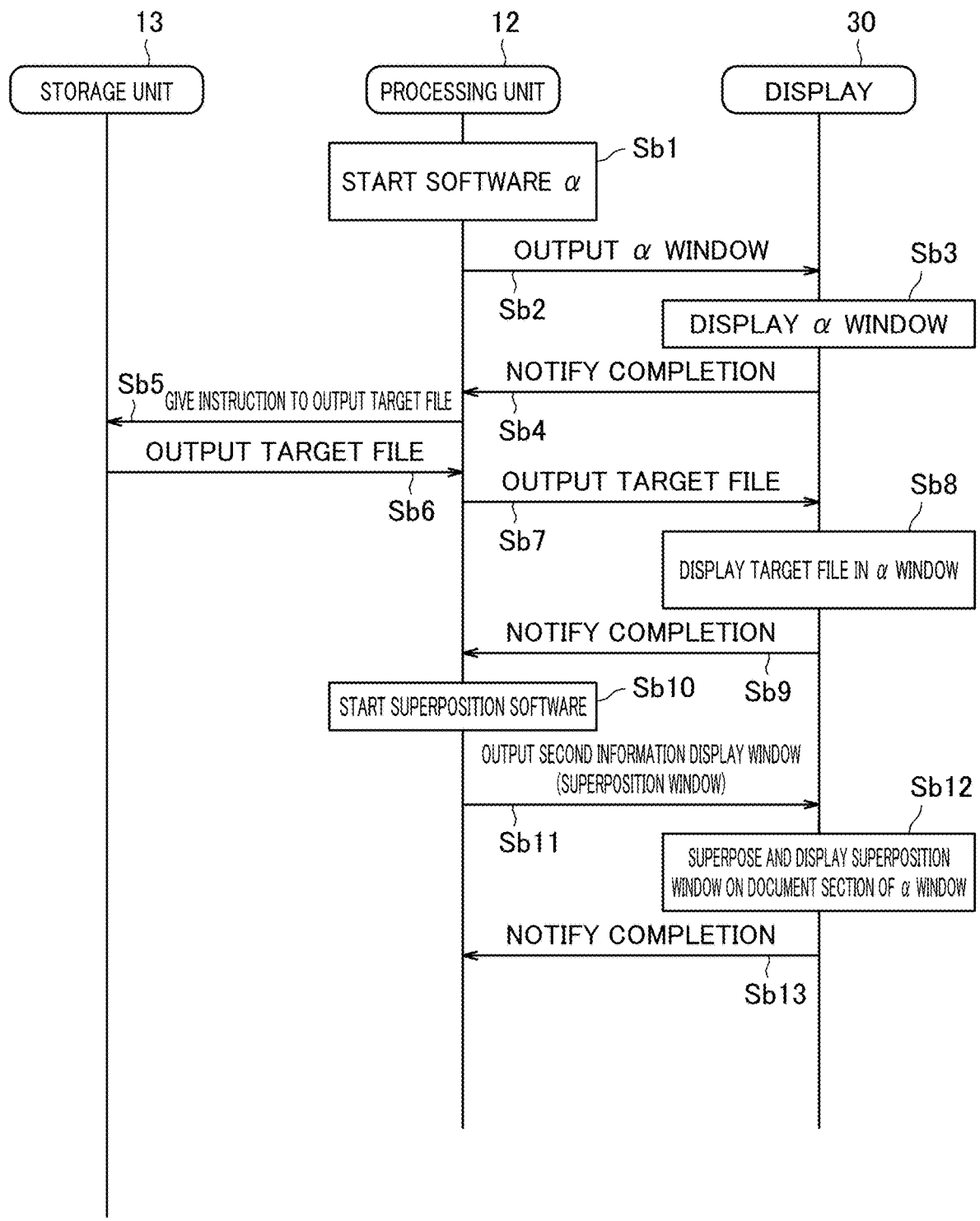
FIG. 8 is a sequence chart showing a flow when generating the second information display window to be superposed on a target file displayed in the first information display window.

FIG. 8 is a sequence chart showing the flow when generating the second information display window to be superposed on the target file displayed in the first information display window. In FIG. 8, described is the flow when generating the second information display window to be superposed on the target file corresponding to the selected software α in view of the initial setting. Hereinafter, in the embodiment, the second information display window corresponding to superposition software is expressed as a superposition window for the sake of explanation.

First, in step Sb1, the processing unit 12 starts the software α. In step Sb2, the processing unit 12 outputs an α window capable of displaying a file including at least one of letters, symbols, figures, or images corresponding to the software α to the display 30. In step Sb3, the display 30 displays the α window output from the processing unit 12 (first display processing). In step Sb4, the display 30 notifies the processing unit 12 that the α window is displayed (notification of completion). Note that the processing unit 12 starts the software α by taking a click of the user on an icon of the target file corresponding to the software α as a trigger, for example.

In step Sb5, the processing unit 12 gives an instruction to the storage unit 13 to output the target file corresponding to the software α by taking reception of the notification of completion from the display 30 as a trigger. In step Sb6, upon receiving the instruction from the processing unit 12 for outputting the target file corresponding to the software α, the storage unit 13 outputs the target file corresponding to the software α to the processing unit 12. In step Sb7, the processing unit 12 outputs the target file output from the storage unit 13 to the display 30. In step Sb8, the display 30 displays the target file output from the processing unit 12 in the α window. Specifically, the display 30 displays the target file in the document section of the α window. In step Sb9, the display 30 notifies the processing unit 12 that the target file is displayed in the document section of the α window (notification of completion).

Figure 9:
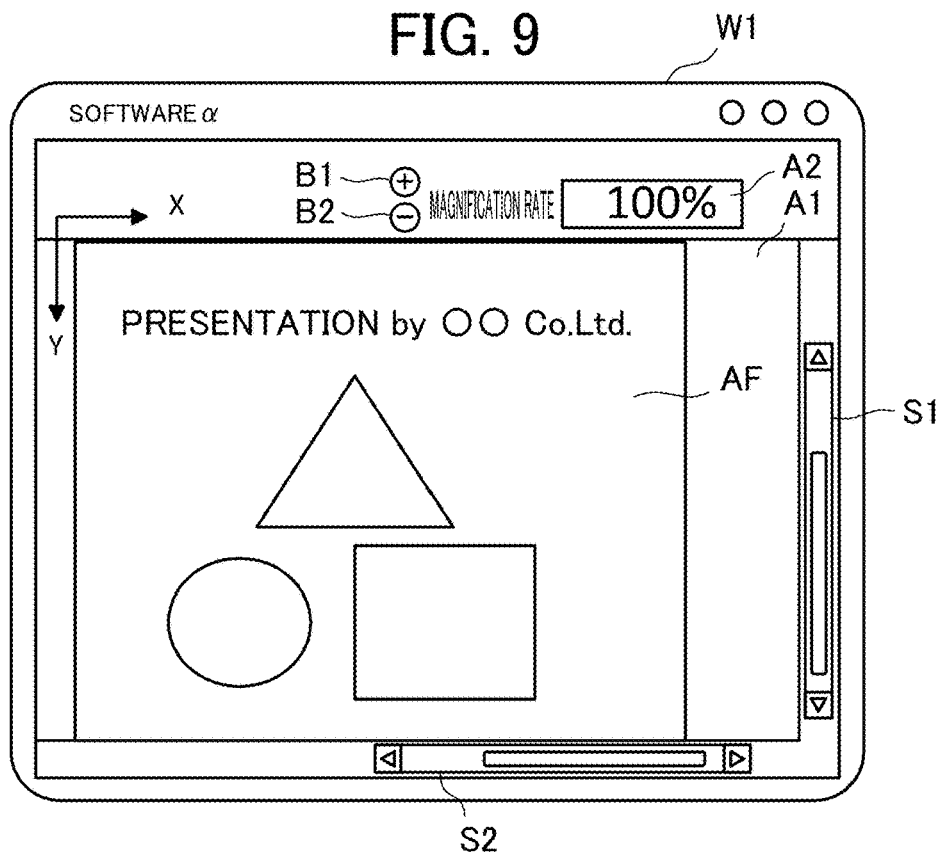
FIG. 9 is a diagram showing the target file displayed in the first information display window of the display.

FIG. 9 is a diagram showing a target file AF displayed in the α window W1 of the display 30. As shown in FIG. 9, the display 30 displays the target file AF output from the processing unit 12 in the document section A1 of the α window W1. The target file AF shown in FIG. 9 includes letters and figures.

In step Sb10, the processing unit 12 starts the superposition software. In step Sb11, the processing unit 12 outputs the superposition window capable of receiving input of the extra information that is at least one of letters, symbols, figures, or images corresponding to the superposition software to the display 30. In step Sb12, the display 30 displays the superposition window output from the processing unit 12 to be superposed at least on a part of the α window (second display processing). In step Sb13, the display 30 notifies the processing unit 12 that the superposition window is displayed (notification of completion). The processing unit 12 according to the embodiment superposes and displays the superposition window on a display area including at least one of letters, symbols, figures, or images among the display areas corresponding to the target file displayed in the α window. Note that the processing unit 12 starts the superposition software by taking start of the OS or a startup operation by the user as a trigger, for example.

Figure 10:
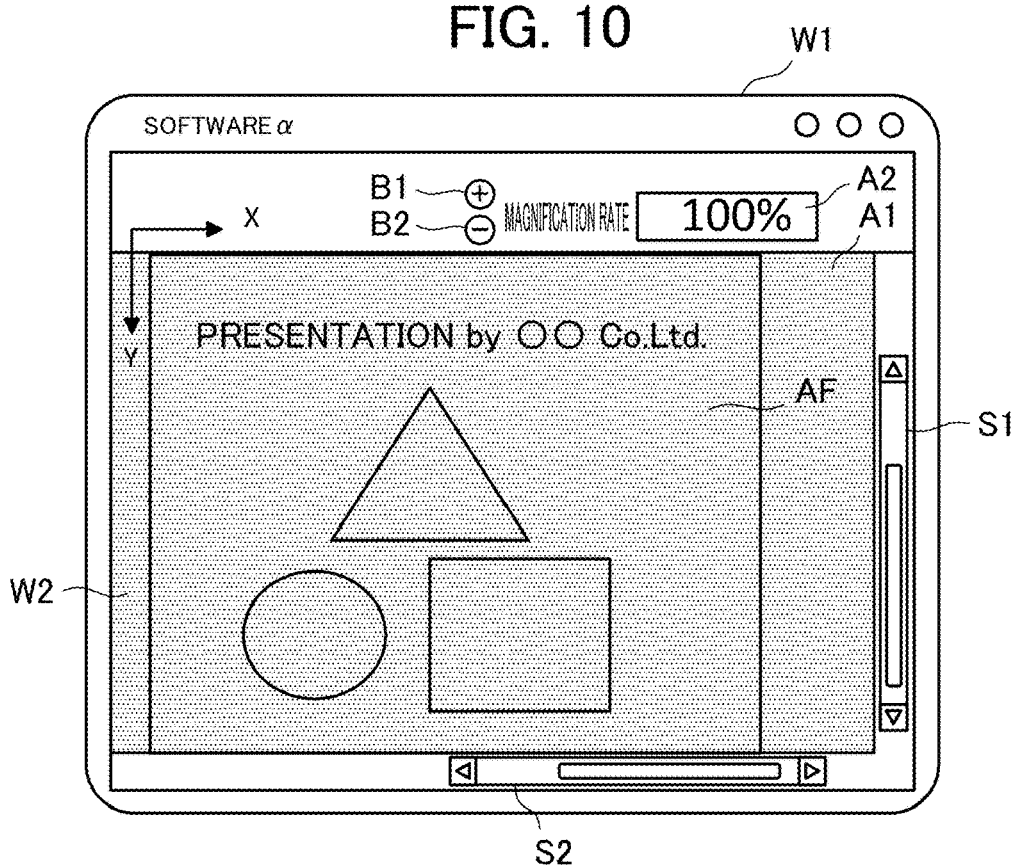
FIG. 10 is a diagram showing the second information display window superposed on the first information display window of the display.

FIG. 10 is a diagram showing a superposition window W2 superposed in the α window W1 of the display 30. As shown in FIG. 10, the display 30 superposes and displays the superposition window W2 output from the processing unit 12 in the display area including letters and figures of the target file displayed in the document section A1 of the α window W1.

In the manner described above, the processing performed by the document management system 1 for generating the superposition window to be superposed on the target file displayed in the α window is completed. Thereby, the document management system 1 according to the embodiment can display the superposition window capable of receiving input of the extra information that is at least one of letters, symbols, figures, or images to be superposed at least on a part of the α window (second display processing).

(Display of Extra Information Input by User)

Figure 11:
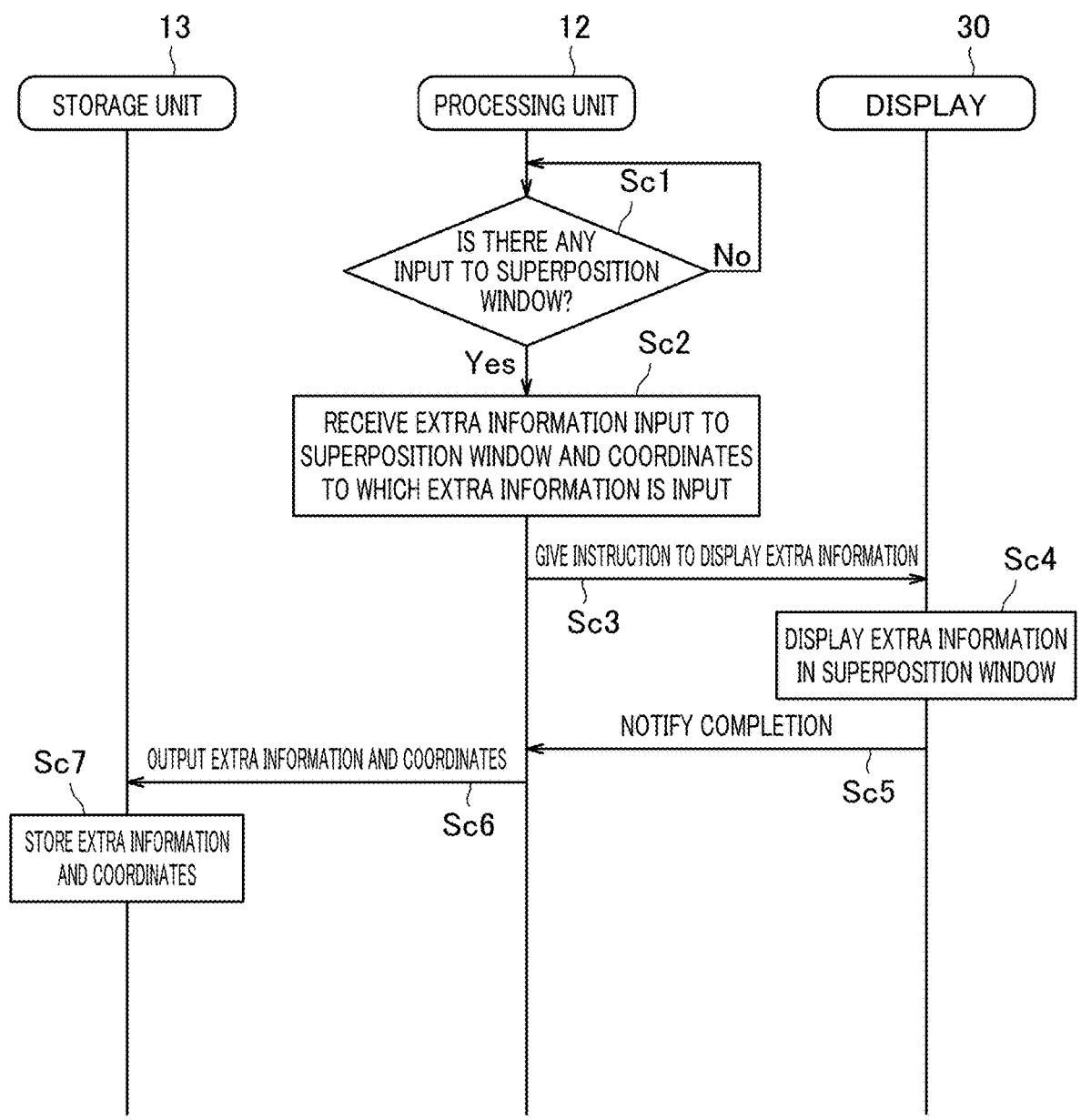
FIG. 11 is a sequence chart showing a flow starting from receiving input of the extra information made by a user to the second information display window up to changing the screen of the display and storing extra information.

FIG. 11 is a sequence chart showing a flow starting from receiving input of the extra information made by the user to the superposition window up to changing the screen of the display 30 and storing the extra information.

In step Sc1, the processing unit 12 determines whether or not there is input of the extra information to the superposition window made by the user. When there is input of the extra information to the superposition window made by the user (Yes in step Sc1), the processing unit 12 in step Sc2 receives the extra information input to the superposition window and the coordinates in the superposition window to which the extra information is input.

In step Sc3, the processing unit 12 outputs an extra information display instruction to the display 30 for displaying the extra information in the superposition window based on the received extra information and the coordinates in the superposition window to which the extra information is input. In step Sc4, the display 30 displays the extra information at the coordinates in the superposition window according to the extra information display instruction from the processing unit 12. In step Sc5, the display 30 notifies the processing unit 12 that the extra information is displayed at the coordinates in the superposition window (notification of completion).

Figure 12:
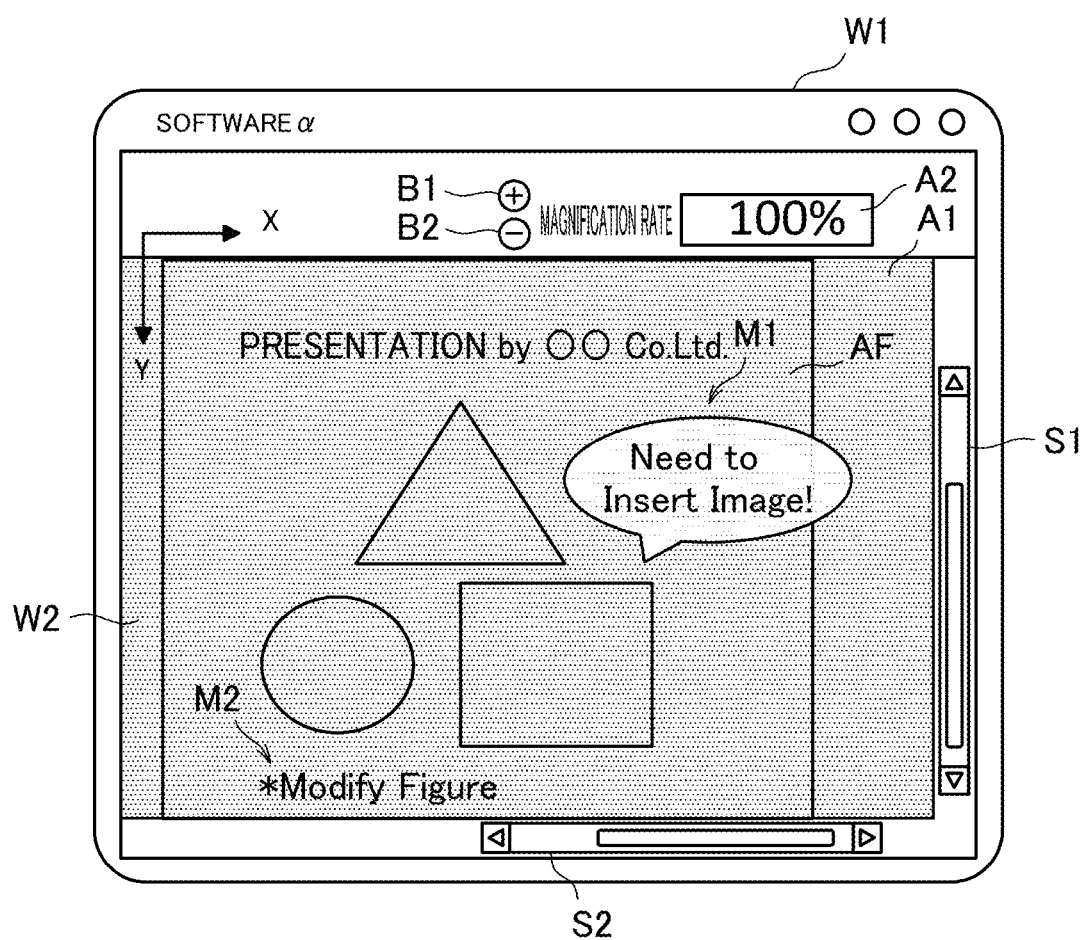
FIG. 12 is a diagram showing the first information display window and the second information display window when displaying the extra information.

FIG. 12 is a diagram showing the α window W1 and the superposition window W2 when the extra information is displayed. As shown in FIG. 12, the display 30 displays the extra information M1 and M2 output from the processing unit 12 in the superposition window W2. For example, the display 30 displays a balloon with "Need to Insert Image!" written therein in the superposition window W2 as the extra information M1. Further, the display 30 displays letters meaning "*Modify Figure" written in red in the superposition window W2 as the extra information M2. Note here that the display 30 displays the background of the superposition window W2 transparently or opaquely. This makes it possible to superpose and display the extra information M1 and M2 input to the superposition window W2 on the target file of the α window W1 without directly editing the target file displayed in the α window W1 (third display processing).

In step Sc6, the processing unit 12 outputs, to the storage unit 13, the received extra information and the coordinates in the superposition window to which the extra information is input. In step Sc7, the storage unit 13 stores the extra information and the coordinates in the superposition window to which the extra information is input, which are output from the processing unit 12. The storage unit 13 according to the embodiment stores the extra information as editable image data. With the editable image data, it is possible to display the background transparently or opaquely and to edit the extra information. Here, Table 3 shows the extra information and the coordinates in the superposition window to which the extra information is input, which are stored in the storage unit 13.

TABLE 3

| File name | Types of extra information | Letter information | Coordinate information | Effect information |
|---|---|---|---|---|
| Target file of software α | Figure (balloon) | "Need to insert image!" | (120, 50) | Background color: yellow Letter color: black |
| | Letters | "*Modify Figure" | (100, 120) | Letter color: red |

Written in Table 3 are the target file name, types of the extra information indicating at least one of letters, symbols, figures, or images, letter information included in the extra information, coordinate information in the superposition window, and effect information such as colors.

In the manner described above, the processing starting from receiving input of the extra information made by the user to the superposition window executed in the document management system 1 up to changing the screen of the display 30 and storing the extra information is completed. Thereby, the document management system 1 according to the embodiment can superpose and display the extra information M1 and M2 input to the superposition window W2 on the target file of the A window W1 without directly editing the target file displayed in the A window W1 (third display processing).

(When Superposition Window to be Superposed on Target File Has Already Been Generated)

Figure 13:
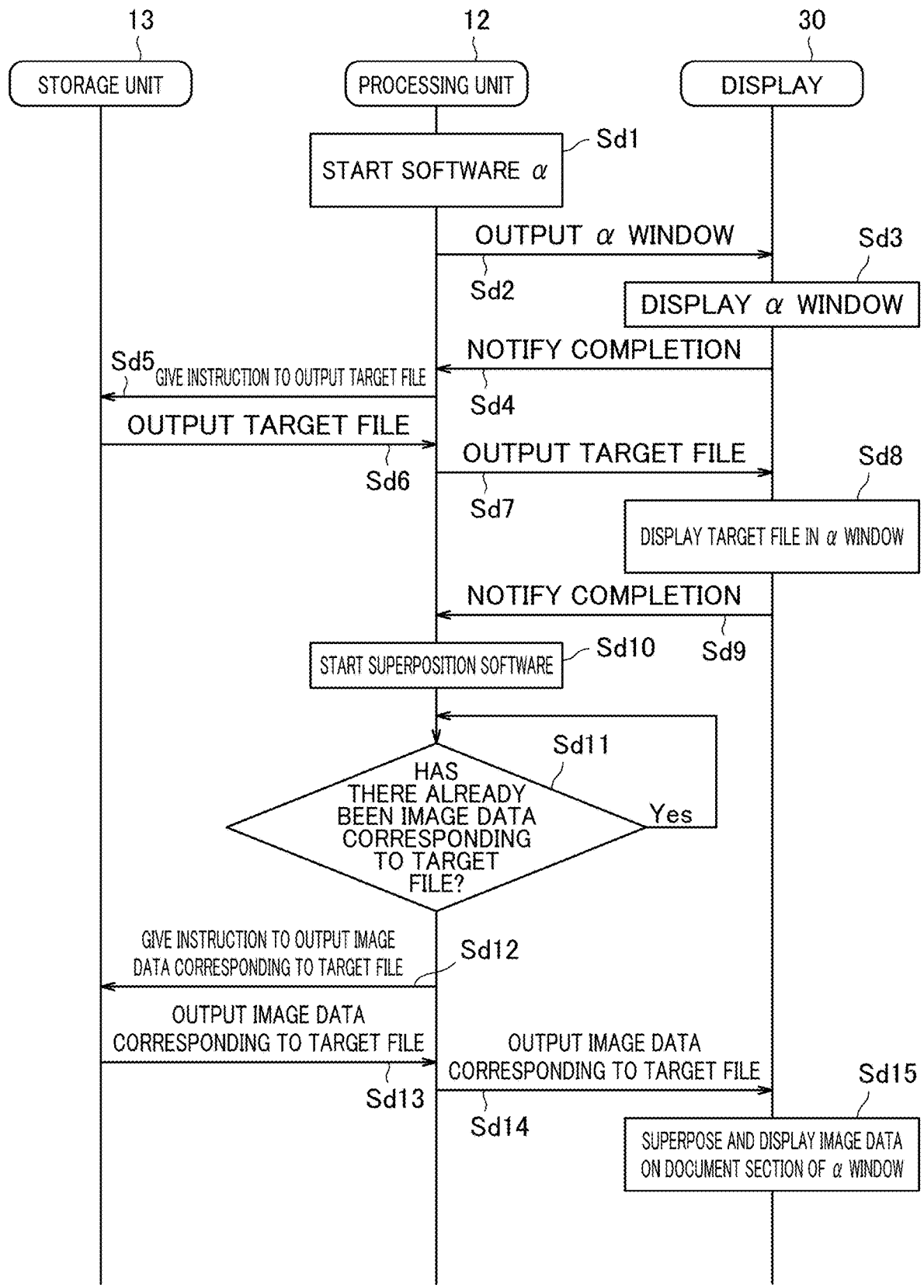
FIG. 13 is a sequence chart showing a flow when displaying the second information display window to be superposed on the target file displayed in the first information display window in a case where the second information display window to be superposed on the target file has already been generated.

FIG. 13 is a sequence chart showing a flow when displaying the second information display window to be superposed on a target file displayed in the first information display window in a case where the superposition window to be superposed on the target file has already been generated. In FIG. 13, described is the flow when displaying the second information display window to be superposed on the target file corresponding to the software α in view of the initial setting. Note that detailed description is omitted for the part duplicating with FIG. 8 for the sake of explanation.

As shown in FIG. 13, in step Sd11, the processing unit 12 determines whether or not there is image data corresponding to the target file. Specifically, the processing unit 12 determines whether or not there is image data corresponding to the target file according to presence of a correspondence table shown as Table 3. When there is image data corresponding to the target file (Yes in step Sd11), the processing unit 12 in step Sd12 gives an instruction to the storage unit 13 to output the image data corresponding to the target file. In step Sb13, upon receiving the output instruction of the image data corresponding to the target file from the processing unit 12, the storage unit 13 outputs the image data corresponding to the target file to the processing unit 12. In step Sb14, the processing unit 12 outputs the image data output from the storage unit 13 to the display 30. The display 30 displays the image data output from the processing unit 12 by superposing it on the α window (second display processing). The processing unit 12 according to the embodiment superposes and displays the image data in a display area including at least one of letters, symbols, figures, or images among the display areas corresponding to the target file displayed in the α window.

Thereby, the processing performed by the document management system 1 for displaying the second information display window to be superposed on the target file that is displayed in the first information display window when the superposition window to be superposed on the target file has already been generated is completed. In the document management system 1 according to the embodiment, the target file and the superposition window to be superposed on the target file are associated by the correspondence table shown as Table 3, for example. That is, the document management system 1 is capable of saving the time and effort that may be required for associating and managing the target file and the superposition window to be superposed on the target file.

(Summary)

As described above, the document management system 1 according to the embodiment is the extra information superposition device that executes the first display processing for displaying the first information display window capable of displaying a file including at least one of letters, symbols, figures, or images by starting first software, the device including: the processing unit that executes the second display processing for displaying the second information display window capable of receiving input of extra information that is at least one of the letters, the symbols, the figures, or the images to be superposed at least on a part of the first information display window by starting the second software independent from the first software and, when there is input of extra information to the second information display window made by the user, executes the third display processing that displays the extra information in the second information display window; the input interface unit that receives the input of the extra information to the second information display window made by the user; and the storage unit that stores the file displayed in the first information display window, the extra information input to the second information display window, and positional coordinates of the extra information in the second information display window in an associated manner, when there is the input of the extra information to the second information display window made by the user.

With the configuration described above, the document management system 1 according to the embodiment can display the second information display window capable of receiving input of the extra information that is at least one of letters, symbols, figures, or images to be superposed at least on a part of the first information display window. Thereby, the document management system 1 can superpose and display the extra information input to the second information display window on the target file in the first information display window without directly editing the target file displayed in the first information display window.

Further, in the document management system 1, the target file and the second information display window to be superposed on the target file are associated by the correspondence table shown as Table 3, for example. That is, the document management system 1 is capable of saving the time and effort that may be required for associating and managing the target file and the second information display window to be superposed on the target file.

Further, when the document management system 1 according to the embodiment is actually operated, following effects can be acquired. For example, even in a case where the original file is protected for security purpose so that writing cannot be added, it is possible to superpose extra information. Further, regardless of the file format of the original file, extra information can be superposed by standardized operations. Furthermore, it is possible to utilize it as a correction tool with which others can write a modification instruction to the image data superposed on the original file and the creator of the original file performs modification thereof, for example. Further, because the extra information can be added without changing the acquired original file, it is possible to provide the intact original file without the extra information being added thereto even when distributing the original file to others on a separate occasion. Furthermore, it is possible to add writing that cannot be executed in the software corresponding to the file. Further, isolated reference and record such as a textbook and a notebook or a slide and a memo can be integrated. Further, it is also possible to deal with a case of an audit log where the file is not desired to be edited and a case where there may cause a problem when the file is changed.

Thereby, the document management system 1 according to the embodiment makes it possible to simplify the work such as data management and association required when inputting memos and the like to electronic data.

In the embodiment described above, the storage unit 13 stores the extra information and the coordinates in the superposition window to which the extra information is input, which are output from the processing unit 12. However, the storage unit 13 according to the embodiment is not limited to that. For example, the storage unit 13 according to the embodiment may store the past image data of any generations such as "latest image data, image data of one generation ago, image data of two generations ago, . . . ". Thereby, the document management system 1 according to the embodiment can perform version management of the extra information.

Further, the image data in the embodiment can be output separately from the original file or may be output by being superposed on the original file from an external output apparatus such as a printer. Therefore, the document management system 1 according to the embodiment can select and output necessary information depending on the circumstances.

Further, the term "prescribed processor" used in the explanation provided above means a dedicated or multipurpose processor or an application specific integrated circuit (ASIC), a programmable logic device (for example, Simple Programmable Logic Device: SPLD), a complex programmable logic device (CPLD), and a field programmable gate array (FPGA), for example. Further, each structural element (each processing unit) of the embodiment is not limited to a single processor but may be implemented by a plurality of processors. Further, a plurality of structural elements (a plurality of processing units) may be implemented by a single processor.

It is to be noted that the present invention is not limited to the embodiment described above but various modifications are possible within the scope of the present invention as defined in the appended claims, of course.

<First Aspect of the Present Invention>

The first aspect of the present invention causes a computer configured to execute, by starting first software to implement, first display processing for displaying a first information display window capable of displaying a file including at least one of letters, symbols, figures, or images to function as an extra information superposition device including a processing unit and a storage unit, the medium comprising: wherein the processing unit configured to (i) execute second display processing for displaying a second information display window capable of receiving input of extra information that is at least one of the letters, the symbols, the figures, or the images to be superposed at least on a part of the first information display window, by starting second software independent from the first software to implement, and (ii) execute third display processing for displaying the extra information in the second information display window, when there is input of the extra information to the second information display window made by a user; and wherein the storage unit configured to store the file displayed in the first information display window, the extra information input to the second information display window, and positional coordinates of the extra information in the second information display window in an associated manner, when there is the input of the extra information to the second information display window made by the user.

With the above-described configuration, the first aspect of the present invention includes displaying the second information display window capable of receiving input of extra information that is at least one of the letters, the symbols, the figures, or the images to be superposed at least on a part of the first information display window. Thereby, the first aspect of the present invention can superpose and display the extra information input to the second information display window on the target file of the first information display window without directly editing the target file displayed in the first information display window. Further, the first aspect of the present invention includes associating the target file with the second information display window to be superposed on the target file. That is, the first aspect of the present invention can save the time and effort that may be required for associating and managing the target file and the second information display window to be superposed on the target file.

Thereby, the first aspect of the present invention makes it possible to simplify the work such as data management and association required when inputting memos and the like to electronic data.

<Second Aspect of the Present Invention>

In the second aspect of the present invention according to the first aspect of the present invention, the processing unit includes: execution of linkage information calculation processing for calculating the number of shifted pixels and a magnification rate of at least one of the letters, the symbols, the figures, or the images included in the file when horizontal scrolling, vertical scrolling, or enlargement is executed in the first information display window; and execution of fourth display processing for horizontally scrolling, vertically scrolling, or enlarging the extra information input to the second information display window according to the calculated number of shifted pixels and magnification rate of at least one of the letters, the symbols, the figures, or the images included in the file in the first information display window.

<Third Aspect of the Present Invention>

In the third aspect of the present invention according to the second aspect of the present invention: the storage unit includes storing a correction file that has a format displayable in the first information display window and includes a plurality of figures; and the processing unit includes (i) displaying the correction file in the first information display window, and (ii) calculating, in the linkage information calculation processing, the number of shifted pixels and the magnification rate of at least one of the letters, the symbols, the figures, or the images included in the file when horizontal scrolling, vertical scrolling, or enlargement is executed in the first information display window based on initial coordinates of each of the plurality of figures of the correction file in the first information display window, coordinates of each of the plurality of figures in the first information display window when the correction file is horizontally scrolled, coordinates of each of the plurality of figures in the first information display window when the correction file is vertically scrolled, and coordinates of each of the plurality of figures in the first information display window when the correction file is enlarged.

<Fourth Aspect of the Present Invention>

In the fourth aspect of the present invention according to the first aspect of the present invention, the processing unit includes, as the second display processing, superposing and displaying the second information display window in an area that includes at least one of the letters, the symbols, the figures, or the images among display areas of a display corresponding to the file displayed in the first information display window.

<Fifth Aspect of the Present Invention>

The fifth aspect of the present invention is used in a computer including a processing unit configured to execute first display processing for displaying a first information display window capable of displaying a file including at least one of letters, symbols, figures, or images, by starting first software to implement, and a storage unit, the aspect including: executing, in the processing unit, second display processing for displaying a second information display window capable of receiving input of extra information that is at least one of the letters, the symbols, the figures, or the images to be superposed at least on a part of the first information display window, by starting second software independent from the first software to implement; executing, in the processing unit, third display processing that displays the extra information in the second information display window, when there is input of extra information to the second information display window made by a user; and storing, in the storage unit, the file displayed in the first information display window, the extra information input to the second information display window, and positional coordinates of the extra information in the second information display window in an associated manner, when there is the input of the extra information to the second information display window made by the user.

With the above-described configuration, the fifth aspect of the present invention includes displaying the second information display window capable of receiving input of extra information that is at least one of the letters, the symbols, the figures, or the images to be superposed at least on a part of the first information display window. Thereby, the fifth aspect of the present invention can superpose and display the extra information input to the second information display window on the target file of the first information display window without directly editing the target file displayed in the first information display window. Further, the fifth aspect of the present invention includes associating the target file with the second information display window to be superposed on the target file. That is, the fifth aspect of the present invention can save the time and effort that may be required for associating and managing the target file and the second information display window to be superposed on the target file.

Thereby, the fifth aspect of the present invention makes it possible to simplify the work such as data management and association required when inputting memos and the like to electronic data.

<Sixth Aspect of the Present Invention>

The sixth aspect of the present invention includes: a processing unit configured to (i) execute, by starting first software to implement, first display processing for displaying a first information display window capable of displaying a file including at least one of letters, symbols, figures, or images, (ii) execute second display processing for displaying a second information display window capable of receiving input of extra information that is at least one of the letters, the symbols, the figures, or the images to be superposed at least on a part of the first information display window, by starting second software independent from the first software to implement, and (iii) execute third display processing for displaying the extra information in the second information display window, when there is input of extra information to the second information display window made by a user; an input interface unit configured to receive the input of the extra information to the second information display window made by the user; and a storage unit configured to store the file displayed in the first information display window, the extra information input to the second information display window, and positional coordinates of the extra information in the second information display window in an associated manner, when there is the input of the extra information to the second information display window made by the user.

With the above-described configuration, the sixth aspect of the present invention includes displaying the second information display window capable of receiving input of extra information that is at least one of the letters, the symbols, the figures, or the images to be superposed at least on a part of the first information display window. Thereby, the sixth aspect of the present invention can superpose and display the extra information input to the second information display window on the target file of the first information display window without directly editing the target file displayed in the first information display window. Further, the sixth aspect of the present invention includes associating the target file with the second information display window to be superposed on the target file. That is, the sixth aspect of the present invention can save the time and effort that may be required for associating and managing the target file and the second information display window to be superposed on the target file.

Thereby, the sixth aspect of the present invention makes it possible to simplify the work such as data management and association required when inputting memos and the like to electronic data.

EXPLANATION OF REFERENCE SIGNS

1 Document management system
10 Electronic computer (extra information superposition device)
11 Input interface unit
12 Processing unit
13 Storage unit
14 Output interface unit
15 Bus
20 Input unit
30 Display

What is claimed is:

1. Non-transitory computer-readable medium storing an extra information superposition program causing a computer configured to execute, by starting first software to implement, first display processing for displaying a first information display window capable of displaying a file including at least one of letters, symbols, figures, or images to function as an extra information superposition device including a processing unit and a storage unit, the medium comprising:
   wherein the processing unit is configured to
   (i) execute second display processing in an actual operation stage for displaying a second information display window capable of receiving input of extra information that is at least one of the letters, the symbols, the figures, or the images to be superposed at least on a part of the first information display window, by starting second software independent from the first software to implement, and
   (ii) execute third display processing in the actual operation stage for displaying the extra information in the second information display window, when there is input of the extra information to the second information display window made by a user; and
   wherein the storage unit is configured to store the file displayed in the first information display window, the extra information input to the second information display window, and positional coordinates of the extra information in the second information display window in an associated manner, when there is the input of the extra information to the second information display window made by the user, and
   wherein the storage unit includes storing a correction file that has a format displayable in the first information display window and includes a plurality of figures,
   wherein the processing unit includes:
   (iii) displaying the correction file in the first information display window in an initial setting stage; and
   (iv) execution of linkage information calculation processing in the initial setting stage for calculating the number of shifted pixels per horizontal scroll, number of shifted pixels per vertical scroll, and a magnification rate of at least one of the letters, the symbols, the figures, or the images included in the file when horizontal scrolling, vertical scrolling, or enlargement is executed in the first information display window based on initial coordinates of each of the plurality of figures of the correction file in the first information display window, coordinates of each of the plurality of figures in the first information display window when the correction file is horizontally scrolled, coordinates of each of the plurality of figures in the first information display window when the correction file is vertically scrolled, and coordinates of each of the plurality of figures in the first information display window when the correction file is enlarged,
   wherein the storage unit includes storing the number of shifted pixels per horizontal scroll, number of shifted pixels per vertical scroll, and magnification rate calculated by execution of linkage information calculation processing, and wherein the processing unit includes (v) execution of fourth display processing in the actual operation stage, wherein the fourth display processing includes:

horizontally moving, in accordance with the number of shifted pixels per horizontal scroll stored in the storage unit, the extra information input to the second information display window, when the file displayed in the first information display window is horizontally scrolled;

vertically moving, in accordance with the number of shifted pixels per vertical scroll stored in the storage unit, the extra information input to the second information display window, when the file displayed in the first information display window is vertically scrolled; and enlarging, in accordance with the magnification rate stored in the storage unit, the extra information input to the second information display window, when the file displayed in the first information display window is enlarged.

2. The medium according to claim 1, wherein the processing unit includes, as the second display processing, superposing and displaying the second information display window in an area that includes at least one of the letters, the symbols, the figures, or the images among display areas of a display corresponding to the file displayed in the first information display window.

3. An extra information superposition method used in a computer including a processing unit configured to execute first display processing for displaying a first information display window capable of displaying a file including at least one of letters, symbols, figures, or images, by starting first software to implement, and a storage unit, the method comprising:

executing, in the processing unit, second display processing in an actual operation stage for displaying a second information display window capable of receiving input of extra information that is at least one of the letters, the symbols, the figures, or the images to be superposed at least on a part of the first information display window, by starting second software independent from the first software to implement;

executing, in the processing unit, third display processing in the actual operation stage for displaying the extra information in the second information display window, when there is input of extra information to the second information display window made by a user;

storing, in the storage unit, the file displayed in the first information display window, the extra information input to the second information display window, and positional coordinates of the extra information in the second information display window in an associated manner, when there is the input of the extra information to the second information display window made by the user;

storing, in the storage unit, a correction file that has a format displayable in the first information display window and includes a plurality of figures;

displaying, in the processing unit, the correction file in the first information display window in an initial setting stage;

executing, in the processing unit, linkage information calculation processing in the initial setting stage for calculating the number of shifted pixels per horizontal scroll, number of shifted pixels per vertical scroll, and a magnification rate of at least one of the letters, the symbols, the figures, or the images included in the file when horizontal scrolling, vertical scrolling, or enlargement is executed in the first information display window based on initial coordinates of each of the plurality of figures of the correction file in the first information display window, coordinates of each of the plurality of figures in the first information display window when the correction file is horizontally scrolled, coordinates of each of the plurality of figures in the first information display window when the correction file is vertically scrolled, and coordinates of each of the plurality of figures in the first information display window when the correction file is enlarged;

storing, in the storage unit, the number of shifted pixels per horizontal scroll, number of shifted pixels per vertical scroll, and magnification rate calculated by execution of linkage information calculation processing; and executing, in the processing unit, fourth display processing in the actual operation stage, wherein the fourth display processing includes:

horizontally moving, in accordance with the number of shifted pixels per horizontal scroll stored in the storage unit, the extra information input to the second information display window, when the file displayed in the first information display window is horizontally scrolled;

vertically moving, in accordance with the number of shifted pixels per vertical scroll stored in the storage unit, the extra information input to the second information display window, when the file displayed in the first information display window is vertically scrolled; and enlarging, in accordance with the magnification rate stored in the storage unit, the extra information input to the second information display window, when the file displayed in the first information display window is enlarged.

4. An extra information superposition device configured to execute first display processing for displaying a first information display window capable of displaying a file including at least one of letters, symbols, figures, or images, by starting first software to implement, the device comprising:

a processing unit configured to (i) execute second display processing in an actual operation stage for displaying a second information display window capable of receiving input of extra information that is at least one of the letters, the symbols, the figures, or the images to be superposed at least on a part of the first information display window, by starting second software independent from the first software to implement, and (ii) execute third display processing in the actual operation stage for displaying the extra information in the second information display window, when there is input of the extra information to the second information display window made by a user;

an input interface unit configured to receive the input of the extra information to the second information display window made by the user; and a storage unit configured to store the file displayed in the first information display window, the extra information input to the second information display window, and positional coordinates of the extra information in the second information display window in an associated manner, when there is the input of the extra information to the second information display window made by the user, and wherein the storage unit includes storing a correction file that has a format displayable in the first information display window and includes a plurality of figures, wherein the processing unit includes:

(iii) displaying the correction file in the first information display window in an initial setting stage;

(iv) execution of linkage information calculation processing in the initial setting stage for calculating the number of shifted pixels per horizontal scroll, number of shifted pixels per vertical scroll, and a magnification rate of at least one of the letters, the symbols, the figures, or the images included in the file when horizontal scrolling, vertical scrolling, or enlargement is executed in the first information display window based on initial coordinates of each of the plurality of figures of the correction file in the first information display window, coordinates of each of the plurality of figures in the first information display window when the correction file is horizontally scrolled, coordinates of each of the plurality of figures in the first information display window when the correction file is vertically scrolled, and coordinates of each of the plurality of figures in the first information display window when the correction file is enlarged, wherein the storage unit includes storing the number of shifted pixels per horizontal scroll, number of shifted pixels per vertical scroll, and magnification rate calculated by execution of linkage information calculation processing, and wherein the processing unit includes (v) execution of fourth display processing in the actual operation stage, wherein the fourth display processing includes:

horizontally moving, in accordance with the number of shifted pixels per horizontal scroll stored in the storage unit, the extra information input to the second information display window, when the file displayed in the first information display window is horizontally scrolled;

vertically moving, in accordance with the number of shifted pixels per vertical scroll stored in the storage unit, the extra information input to the second information display window, when the file displayed in the first information display window is vertically scrolled; and enlarging, in accordance with the magnification rate stored in the storage unit, the extra information input to the second information display window, when the file displayed in the first information display window is enlarged.

* * * * *